(12) United States Patent
Kim (10) Patent No.: US 8,487,851 B2
(45) Date of Patent: Jul. 16, 2013

(54) LIQUID CRYSTAL DISPLAY

(75) Inventor: Cheol Se Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1023 days.

(21) Appl. No.: 11/639,811

(22) Filed: Dec. 14, 2006

(65) Prior Publication Data

US 2008/0001902 A1     Jan. 3, 2008

(30) Foreign Application Priority Data

Jun. 28, 2006   (KR) .................. 10-2006-0058571

(51) Int. Cl.
*G09G 3/36* (2006.01)
(52) U.S. Cl.
USPC .............. 345/89; 345/88; 345/92; 345/93; 345/94; 345/95
(58) Field of Classification Search
USPC .................................. 345/87–103
See application file for complete search history.

(56) References Cited

U.S. PATENT DOCUMENTS

| | | | |
|---|---|---|---|
| 5,796,447 A * | 8/1998 | Okumura et al. | 349/33 |
| 2002/0109652 A1* | 8/2002 | Lim et al. | 345/87 |
| 2003/0146890 A1* | 8/2003 | Sasaki | 345/87 |
| 2004/0017344 A1* | 1/2004 | Takemoto | 345/87 |
| 2005/0046763 A1* | 3/2005 | Ono et al. | 349/39 |
| 2005/0140907 A1* | 6/2005 | Yun | 349/144 |

* cited by examiner

*Primary Examiner* — Amr Awad
*Assistant Examiner* — Andre Matthews
(74) *Attorney, Agent, or Firm* — Brinks Hofer Gilson & Lione

(57) ABSTRACT

A liquid crystal display device is configured to improve display quality by minimizing flickers and residual images through inversion. The inversion may include changing the polarity of the data voltages. A first liquid crystal cell may be charged with a potential difference between a first data voltage supplied to a first pixel electrode and a second data voltage supplied to an adjacent second pixel.

15 Claims, 5 Drawing Sheets

LIQUID CRYSTAL DISPLAY

This application claims the benefit of the Korean Patent Application No. P06-0058571 filed in Korea on Jun. 28, 2006, which is hereby incorporated by reference.

BACKGROUND

1. Field of the Disclosure

The present disclosure relates to a liquid crystal display device that is configured to improve display quality by minimizing flickers and residual images.

2. Description of the Related Art

Generally, a liquid crystal display device controls the light transmittance of liquid crystal through the electric field, thereby displaying a picture. The liquid crystal display device includes a liquid crystal display panel where liquid crystal cells are arranged in a matrix shape. A drive circuit is used for driving the liquid crystal display panel.

Figure 1:
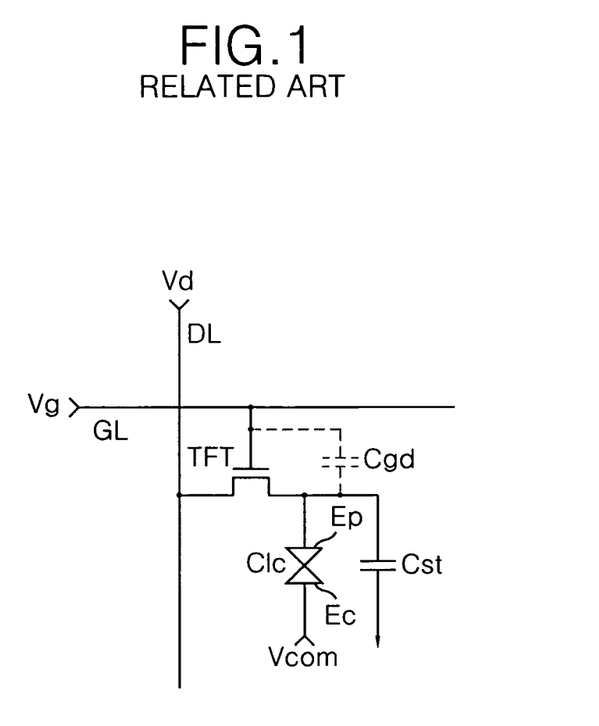
FIG. 1 is a diagram of a pixel cell included in a liquid crystal display panel according to the related art.

In the liquid crystal display panel, as shown in FIG. 1, a gate line GL crosses a data line DL. A thin film transistor TFT for driving a liquid crystal cell is formed at the crossing point of the gate line GL and the data line DL. The thin film transistor TFT supplies a data voltage Vd through the data line DL to a pixel electrode Ep of the liquid crystal cell Clc in response to a scan signal supplied through the gate line GL. A gate electrode of the thin film transistor TFT is connected to the gate line GL and a source electrode is connected to the data line DL. A drain electrode is connected to the pixel electrode of the liquid crystal cell Clc. The liquid crystal cell Clc is charged with a potential difference between a common voltage Vcom supplied to a common electrode Ec and the data voltage Vd supplied to the pixel electrode Ep. The arrangement of liquid crystal molecules may be modified by an electric field, which is formed by the potential difference and may control the amount of the transmitted light or to intercept the light. The common electrode Ec is formed in an upper substrate or a lower substrate of the liquid crystal display panel through the application of the electric field to the liquid crystal cell Clc. A storage capacitor Cst for maintaining a charge voltage of the liquid crystal cell Clc is formed between the common electrode Ec and the pixel electrode Ep of the liquid crystal cell Clc.

Figure 2:
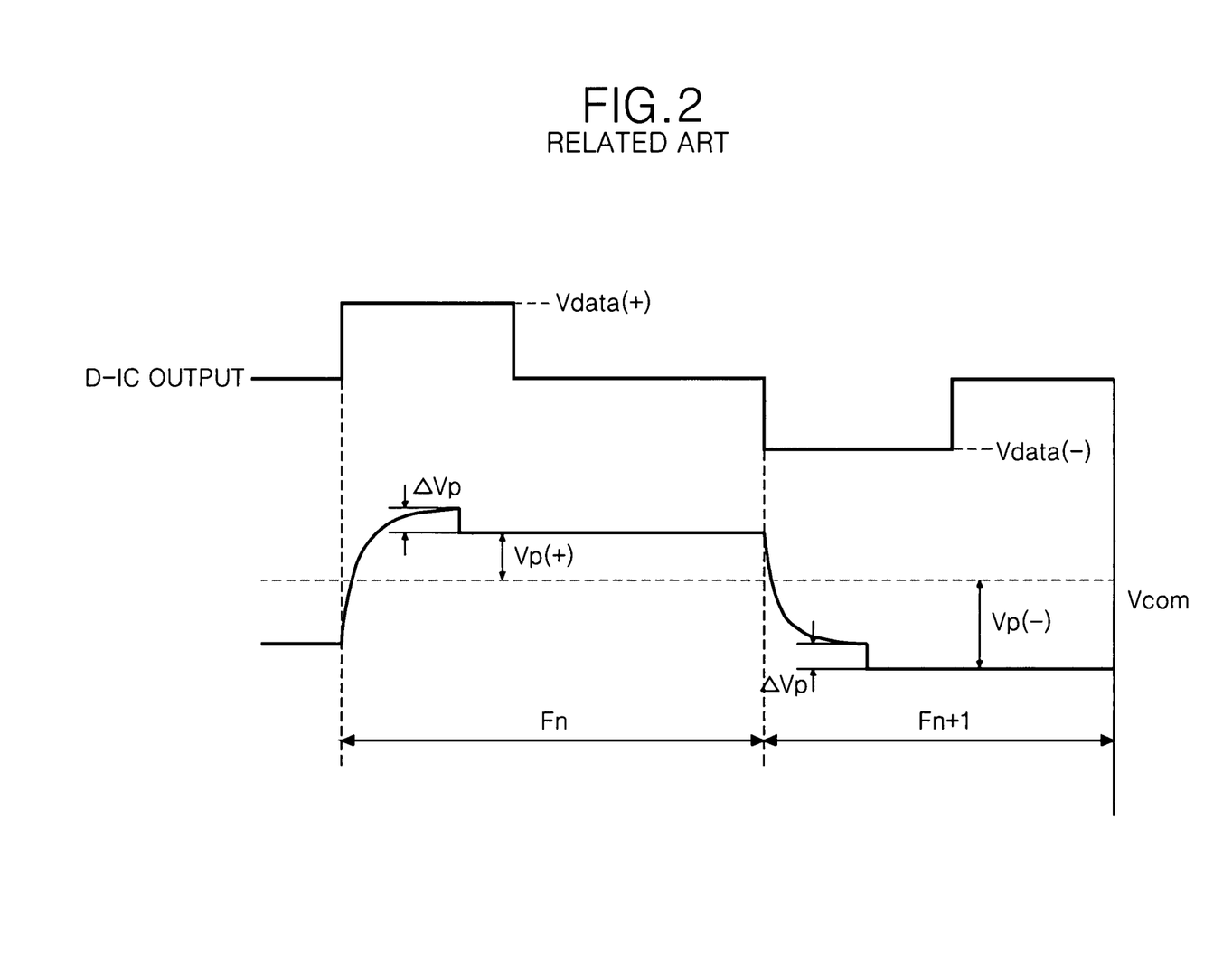
FIG. 2 is a waveform diagram showing the appearance of flickers and residual images according to the related art.

Referring to FIG. 2, after a positive data voltage is supplied to a specific liquid crystal cell for a scan time (one horizontal period) of $n^{th}$ frame period Fn, a negative data voltage is supplied to the same liquid crystal cell for a scan time of the $(n+1)^{th}$ frame period Fn+1. For the $n^{th}$ frame period Fn, the liquid crystal cell is charged as much as the positive data voltage outputted from the data drive IC (D-IC). The cell then maintains a positive pixel voltage Vp(+) of which the absolute value is lowered by $\Delta Vp$ below a charge voltage by a parasitic capacitance of the TFT. Conversely, for the $(n+1)^{th}$ frame period Fn+1, the liquid crystal cell is charged as much as the negative data voltage outputted from the data drive IC (D-IC), and then maintains a negative pixel voltage Vp(−) of which the absolute value is highered by $\Delta Vp$ above the charge voltage by the parasitic capacitance of the TFT. Accordingly, even though the data voltage of the same gray level is supplied to the liquid crystal cell, the brightness and pixel voltage charged in the liquid crystal cell become higher in the negative data voltage than in the positive data voltage.

The positive pixel voltage Vp(+) of the liquid crystal cell is a difference voltage between a positive data voltage Vdata (+) and a common voltage Vcom, i.e., Vp(+)=|Vdata(+)−Vcom|. And, the negative pixel voltage Vp(−) of the liquid crystal cell is a difference voltage between a negative data voltage Vdata (−) and a common voltage Vcom, i.e., Vp(−)=|Vdata(−)−Vcom|.

Accordingly, if the polarity of the data voltage is inverted for each frame in the data of the same gray level, the brightness may be changed by the unit of a frame period, and as a result, an observer may notice a flicker phenomenon in that a screen periodically flickers. Further, if the pixel voltage charged in the liquid crystal cell is changed in accordance with the polarity of the data voltage, the residual image may appear on the screen because of the asymmetry of the data, thus the display quality may be further deteriorated.

BRIEF SUMMARY

By way of introduction, the embodiments described below include a system and method for providing a liquid crystal display device that is adapted for improving display quality by minimizing flickers and residual images. The embodiments relate to charging a first liquid crystal cell with a potential difference between a first data voltage supplied to a first pixel electrode and a second data voltage supplied to an adjacent second pixel.

In a first aspect, a liquid crystal display device includes a plurality of data lines and a data drive circuit for supplying a data voltage to the data lines. A plurality of gate lines cross the data lines. A first electrode is shared by liquid crystal cells that are adjacent in a horizontal direction in a first substrate. A second electrode is shared by the liquid crystal cells that are adjacent in the horizontal direction and faces the first electrode in the first substrate to form an electric field in each of the adjacent liquid crystal cells. A first switch device electrically connects an odd-numbered data line with the first electrode in response to a scan signal from the gate line. A second switch device electrically connects an even-numbered data line with the second electrode in response to a scan signal from the gate line.

In a second aspect, a liquid crystal display device includes a plurality of data lines and a data drive circuit for supplying a data voltage to the data lines. A plurality of gate lines are coupled with the data lines. A first electrode is coupled with liquid crystal cells that are adjacent to a first substrate. A second electrode is coupled with the liquid crystal cells that are adjacent the first electrode. The first electrode and the second electrode are configured to establish an electric field in the adjacent liquid crystal cells. A first switch device couples a first set of data lines with the first electrode in response to a first scan signal from the gate line. A second switch device couples a second set of data lines with the second electrode in response to a second scan signal from the gate lines.

BRIEF DESCRIPTION OF THE DRAWINGS

The system may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views.

DETAILED DESCRIPTION OF THE EMBODIMENTS

Reference will now be made in detail to the embodiments of the present disclosure, examples of which are illustrated in the accompanying drawings. Herein, the phrase "coupled with" is defined to mean directly connected to or indirectly connected through one or more intermediate components. Such intermediate components may include both hardware and software based components.

Figure 3:
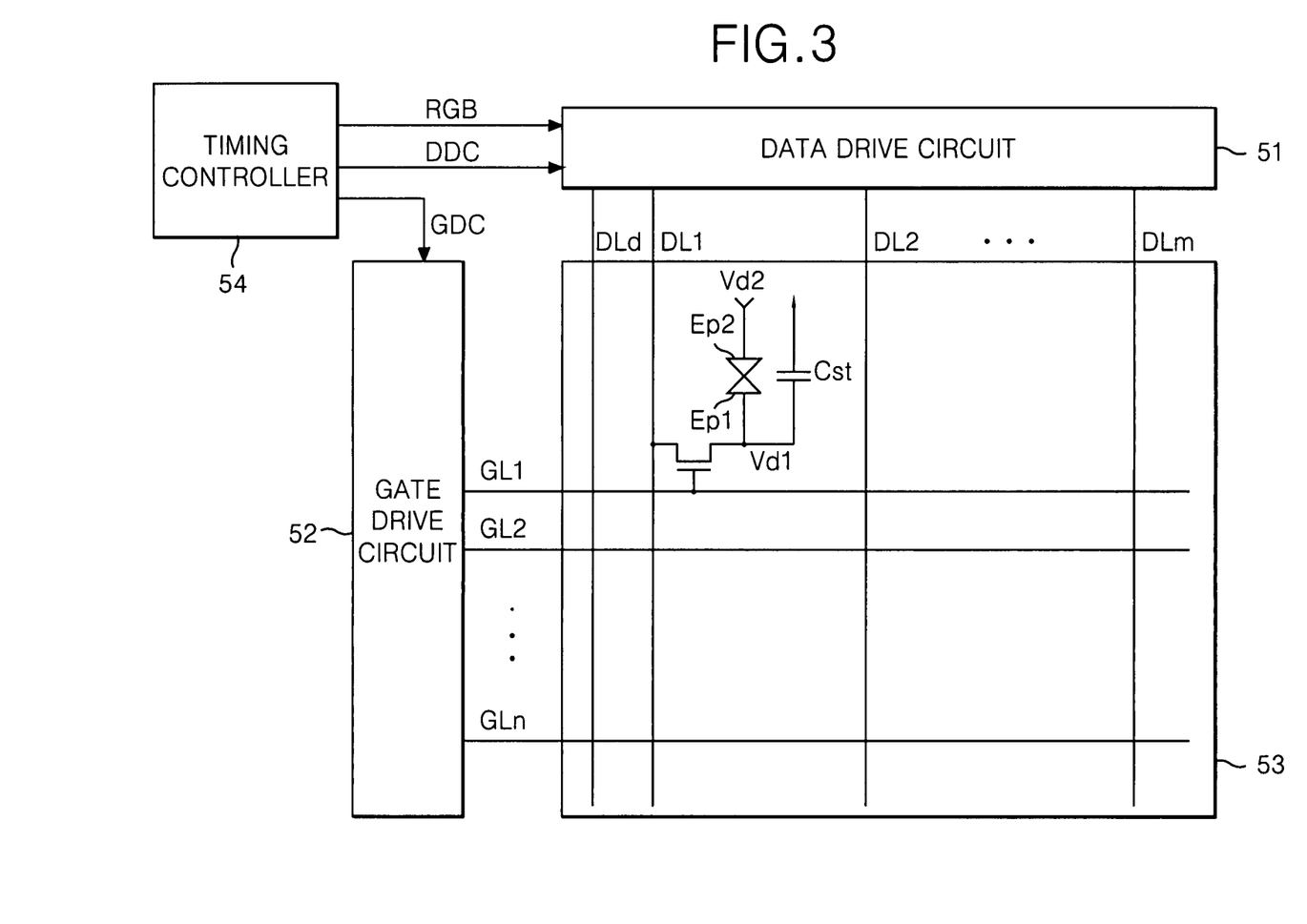
FIG. 3 is a schematic diagram of a liquid crystal display device according to an embodiment.
Figure 4:
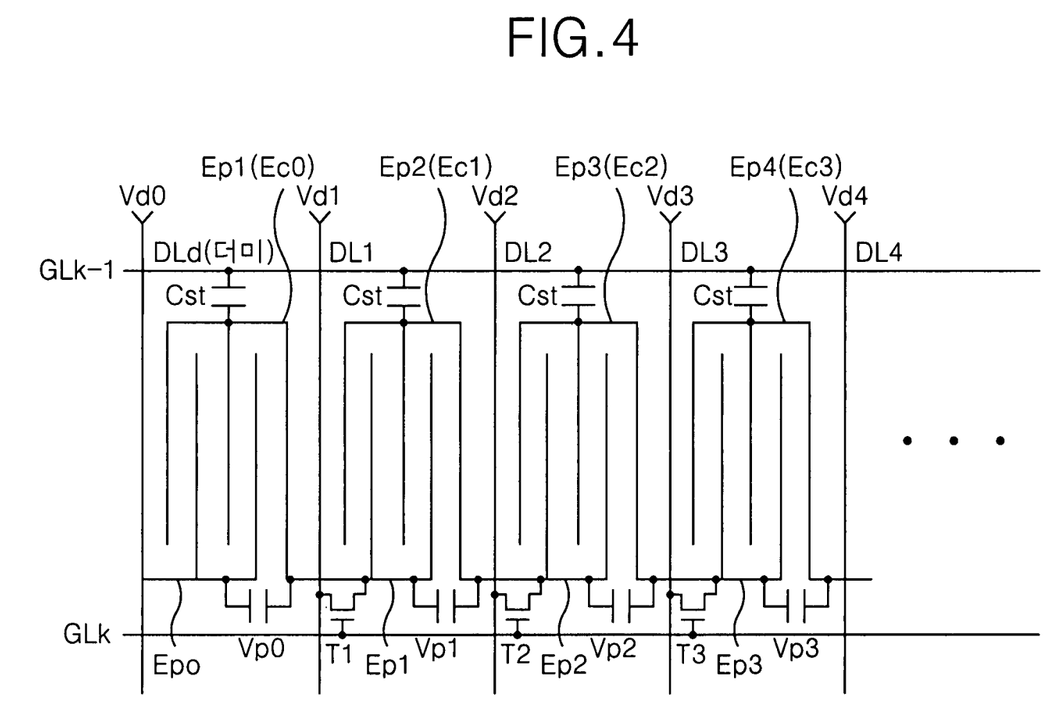
FIG. 4 is a plan view of liquid crystal cells for an electrode structure of a liquid crystal display panel according to an embodiment.
Figure 5:
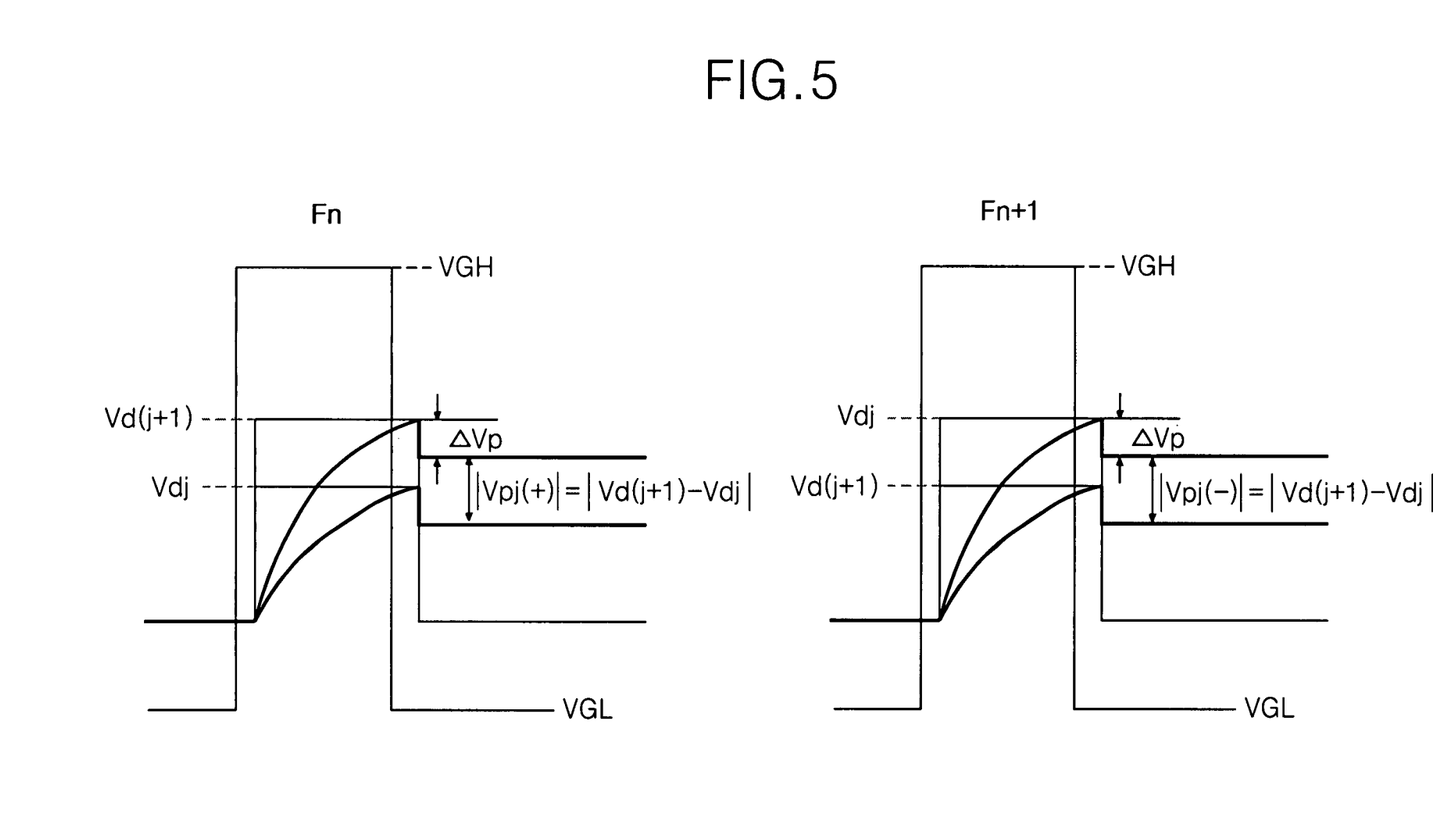
FIG. 5 is a wave form diagram of gray levels with a positive pixel voltage Vpk(+) and a negative pixel voltage Vpk(−) through frame inversion.

With reference to FIGS. 3 to 5, embodiments of the present disclosure will be described below. FIG. 3 is a schematic diagram of a liquid crystal display device according to an embodiment. Referring to FIG. 3, a liquid crystal display device according to one embodiment includes a liquid crystal display panel 53 where a plurality gate lines GL1 to GLn (n is a positive integer) cross a plurality of data lines DL1 to DLm (m is a positive integer). Liquid crystal cells Clc are formed in pixel areas defined by the crossing of the gate lines and the data lines. Thin film transistors TFT are formed at the crossing parts of the gate lines GL1 to GLn and the data lines DL1 to DLm for driving the liquid crystal cells Clc. A data drive circuit 51 supplies a video signal to the data lines DL1 to DLm. A gate drive circuit 52 supplies a scan signal to the gate lines GL1 to GLn. A timing controller 54 controls the data drive circuit 51 and the gate drive circuit 52.

The liquid crystal display panel 53 is formed in or disposed on a structure where an upper substrate is bonded with a lower substrate. The gate lines GL1 to GLn and the data lines DL1 to DLm cross each other in a lower substrate of the liquid crystal display panel 53. A dummy electrode is disposed in the crossing area of the gate lines GL1 to GLn and a dummy data line DLd that is disposed in a pre-stage of the first data line DL1 and a fixed data voltage is supplied through the dummy data line DLd. The dummy electrode can be disposed in a post-stage of the $m^{th}$ data line DLm. The thin film transistor disposed at each crossing part of the gate line GL1 to GLn and the data line DL1 to DLm supplies the data voltage Vd from the $j^{th}$ data line DLj ($1 \leq j \leq m$) to the pixel electrode Ep of the liquid crystal cell Clc in response to the scan signal Vgk from the $K^{th}$ gate line GLk ($1 \leq k \leq n$).

Accordingly, gate electrodes of the thin film transistors TFT are connected to the gate lines GL1 to GLn, drain electrodes are connected to the data lines DL1 to DLm, and source electrodes are connected to the pixel electrodes Ep of the liquid crystal cells Clc, respectively. The $j^{th}$ liquid crystal cell Clc is charged with a potential difference between the $j^{th}$ data voltage Vdj supplied to the $j^{th}$ pixel electrode Epj and the $(j+1)^{th}$ data voltage Vd(j+1) supplied to the $(j+1)^{th}$ pixel electrode Ep(j+1). The arrangement of the liquid crystal molecules is changed or modified by the electric field that is formed by the potential difference in order to control the light amount of the transmitted light or to intercept the light. Accordingly, the common electrode which faces the $j^{th}$ pixel electrode is composed of the $(j+1)^{th}$ pixel electrode Ep(j+1) which is adjacent to the $j^{th}$ pixel electrode horizontally. This will be described below in reference to FIGS. 4 and 5.

A storage capacitor Cst for keeping a charge voltage of the liquid crystal cell Clc for one frame period is formed between the pixel electrode Ep of the liquid crystal cell Clc and the pre-stage gate line GL(k−1). The storage capacitor Cst can be formed by having the $j^{th}$ pixel electrode Epj of the liquid crystal cell overlapped with the $(j+1)^{th}$ pixel electrode Ep(j+1) which is horizontally adjacent thereto. A color filter for realizing the hue, and a black matrix for reducing optical interference between adjacent pixels are formed in the upper substrate of the liquid crystal display panel 53. Further, polarizers of which the optical axes cross each other perpendicularly are stuck to the upper substrate and the lower substrate, respectively. An alignment film for setting a pre-tilt angle of the liquid crystal is disposed in the inner surface of the substrate.

The timing controller 54 receives a vertical/horizontal synchronization signal, a clock signal, and/or other signals from a system interface circuit (not shown). The timing controller 54 generates a gate control signal GDC for controlling the gate drive circuit 52 to supply to the gate drive circuit 52. The timing controller 54 receives a digital video data signal RGB, the vertical/horizontal synchronization signal, the clock signal, and/or other signals from the system interface circuit (not shown) to generate a data control signal DDC for controlling the data drive circuit 51. The timing controller 54 re-aligns the digital video data RGB in accordance with the clock signal to supply the data control signal DDC to the data drive circuit 51. The gate control signal GDC includes a gate start pulse GSP, a gate shift clock GSC, a gate output signal GOE, and/or other signals. The data control signal DDC includes a source start pulse SSP, a source shift clock SSC, a source output signal SOE, a polarity control signal POL, and/or other signals.

The data drive circuit 51 converts the digital video data signal RGB supplied from the timing controller 54 into an analog gamma compensation voltage, i.e., the data voltage Vd, to supply to the data lines DL1 to DLm. Although not shown, the data drive circuit 51 includes a shift register for sampling the clock signal, a register for temporarily storing the digital video data, a latch for storing the data by lines and simultaneously outputting the stored data of one line portion in response to the clock signal from the shift register, a digital/analog converter for selecting positive/negative gamma voltages in response to a digital video data, a multiplexer for selecting the data line DL to which the analog data converted by the positive/negative gamma voltage are supplied, and an output buffer coupled with the multiplexer and the data line DLj. Herein, the phrase "coupled with" is defined to mean directly connected to or indirectly connected through one or more intermediate components. Such intermediate components may include both hardware and software based components.

The gate drive circuit 52 sequentially supplies the scan signal, which selects the horizontal line of the liquid crystal display panel 53 to which the data voltage Vd is supplied, to the gate lines GL1 to GLn. The gate drive circuit 52 includes a shift register which sequentially shifts the gate start pulse to generate a shift output signal, and a level shift for converting the shift output signal from the shift register into the scan signal. The voltage level of the scan signal is suitable for driving the thin film transistor, and is supplied to the gate lines GL1 to GLn.

The liquid crystal display device may be driven by the inversion method where the polarity of the data voltage Vd is inverted for each fixed period in order to prevent the residual image and the deterioration of the liquid crystal cell Clc. The liquid crystal display device may be driven through inversion, such that the polarity of the data voltage Vd is inverted for each fixed period. The inversion may prevent the residual image and the deterioration of the liquid crystal cell Clc. The inversion may be a dot inversion method, a line inversion method, a column inversion method or a frame inversion method.

FIG. 4 is a plan view of liquid crystal cells for an electrode structure of a liquid crystal display panel according to an embodiment. Referring to FIG. 4, the liquid crystal display panel 53 according to one embodiment of the present disclosure is disposed, such that the gate lines GL1 to GLn and the data lines DL1 to DLm cross each other. A dummy electrode Ep0 is disposed in the crossing area of the gate lines GL1 to GLn and a dummy data line DLd. The dummy data line DLd is disposed in the pre-stage of the first data line DL1, to supply a fixed data voltage through the dummy data line DLd. The dummy electrode Ep0 may be disposed in the post-stage of the $m^{th}$ data line DLm. Further, dummy data line DLd and the dummy pixel where the dummy electrode Ep0 is formed are hidden by a black matrix formed in the upper substrate.

The thin film transistor formed at each crossing part of the gate line GL1 to GLn and the data line DL1 to DLm sequentially supplies the data voltage Vd1 to Vdm from the data line DL1 to DLm to the pixel electrode Ep1 to Epm of the liquid crystal cell Clc in response to the scan signal Vgk from the $K^{th}$ gate line GLk ($1 \leq k \leq n$). Accordingly, gate electrodes of the thin film transistors TFT are connected to the gate lines GL1 to GLn, drain electrodes are connected to the data lines DL1 to DLm, and source electrodes are connected to the pixel electrodes Ep1 to Epm of the liquid crystal cells Clc, respectively. The $j^{th}$ liquid crystal cell Clc is charged with a potential difference between the $j^{th}$ data voltage Vdj supplied to the $j^{th}$ ($1 \leq j \leq m$) pixel electrode Epj and the $(j+1)^{th}$ data voltage Vd(j+1) supplied to the $(j+1)^{th}$ pixel electrode Ep(j+1). The arrangement of the liquid crystal molecules is changed by the electric field that is formed by the potential difference to control the light amount of the transmitted light or to intercept the light. Accordingly, the common electrode Ecj which faces the $j^{th}$ pixel electrode Epj is connected to the $(j+1)^{th}$ pixel electrode Ep(j+1) which is adjacent to the $j^{th}$ pixel electrode Epj horizontally.

In other words, as shown in FIG. 4, in the instance where the pixel voltage is Vp1, Vp2, Vp3, Vp4 and the data voltage outputted from the data line DL1 to DLm is Vd1, Vd2, Vd3, Vd4, . . . , a relation equation of Vp1=Vd2−Vd1, Vp2=Vd3−Vd2, Vp3=Vd4−Vd3, . . . , can be made. Accordingly, the data voltage is determined by a relation equation of Vd1=Vd0+Vp0, Vd2=Vd1+Vp1, Vd3=Vd2+Vp2, Vd4=Vd3+Vp3, . . . . Herein, Vd0 may refer to a dummy data voltage supplied to the dummy electrode Ep0, and Vp0 may refer to a pixel voltage charged in the dummy liquid crystal cell.

TABLE 1 (below) represents one example of the data voltage Vdm outputted from the data drive circuit 51 for supplying the pixel voltage Vpm to the liquid crystal cell Clc. For the pixel voltage Vpm, the polarity is inverted from the $n^{th}$ frame and $(n+1)^{th}$ frame. In TABLE 1, when the dummy data voltage Vd0 is 7.5V and the output range of the data drive circuit 51 is 0V~15V, the data voltage corresponding to the pixel voltage Vpm may be determined by the relation equation of V(dm+1)=Vpm(pixel voltage)−Vdm. At this point, the data voltage is set for the polarity of the charged pixel voltage to be alternated between the adjacent pixel electrodes of the liquid crystal cell Clc.

However, the pixel voltage Vp5 entered in TABLE 1 shows the same polarity as the adjacent pixel voltage Vp4, Vp6, and this is because the output range of the data drive circuit 51 is limited to be between 0V~15V. In other words, the data voltage Vd6 should be set to be −2.5V in order for the pixel voltage Vp5 to have a different polarity from the adjacent pixel voltage Vp4, Vp6, but this goes over the output range of the data drive circuit 51. The liquid crystal cell Clc having the same polarity between adjacent cells is rare. The problem caused by this may be solved with a frame inversion drive where the polarity is inverted for each frame. The data voltage is set for the polarity of the pixel voltage to be inverted whenever the frame is changed. Each data voltage value in the $(n+1)^{th}$ frame entered in TABLE 1 is used in order for the pixel voltage charged in the liquid crystal cell to show the same gray level as in the $n^{th}$ frame and to invert only the polarity thereof.

TABLE 1

| | Fn | | Fn + 1 | |
|---|---|---|---|---|
| m | Data voltage (Vdm) | Pixel voltage (Vpm = V(dm + 1) − Vdm) | Data voltage (Vdm) | Pixel voltage (Vpm = V(dm + 1) − Vdm) |
| 0 | 7.5 | 0.5 | 7.5 | −0.5 |
| 1 | 8 | −4.5 | 7 | 4.5 |
| 2 | 3.5 | 0.5 | 11.5 | −0.5 |
| 3 | 4 | −3.5 | 11 | 3.5 |
| 4 | 0.5 | 2.5 | 14.5 | −2.5 |
| 5 | 3 | 5.5 | 12 | −5.5 |
| 6 | 8.5 | 3.5 | 6.5 | −3.5 |
| 7 | 12 | −5.5 | 3 | 5.5 |
| 8 | 6.5 | 4.5 | 8.5 | −4.5 |
| 9 | 11 | | | |

FIG. 5 is a waveform diagram of gray levels with a positive pixel voltage Vpk(+) and a negative pixel voltage Vpk(−) through frame inversion. As shown in FIG. 5, in order to charge a positive gray level voltage for the scan time (one horizontal period) of the $n^{th}$ frame period (Fn), the data voltage Vdj is supplied to the $j^{th}$ pixel electrode Epj of the $j^{th}$ liquid crystal cell Clc. The data voltage Vd(j+1), which is higher than the data voltage Vdj, is supplied to the common electrode Ep(j+1) that faces the $j^{th}$ pixel electrode Epj. For example, as shown in FIG. 4 and TABLE 1, when 3.5V is supplied to the pixel electrode Ep2 of the second liquid crystal cell in order to charge the gray level voltage of 0.5V, 4V is supplied to the common electrode Ep3 of the second liquid crystal cell. The data voltage 3.5V charged in the pixel electrode Ep2 is kept by the parasitic capacitance of the TFT to be lower by ΔVp than the charge voltage and the data voltage 4V charged in the common electrode Ep3 is also kept by the parasitic capacitance of the TFT to be lower by ΔVp than the charge voltage. However, for the scan time (one horizontal period) of the $n^{th}$ frame period (Fn), 0.5V (pixel voltage in the $n^{th}$ frame) being the original gray level voltage is charged and kept in the second liquid crystal cell Clc.

Further, in order to charge a negative gray level voltage for the scan time (one horizontal period) of the $(n+1)^{th}$ frame period (Fn+1), the data voltage Vdj is supplied to the $j^{th}$ pixel electrode Epj of the $j^{th}$ liquid crystal cell Clc. The data voltage Vd(j+1), which is lower than the data voltage Vdj, is supplied to the common electrode Ep(j+1) that faces the $j^{th}$ pixel electrode Epj. For example, as shown in FIG. 4 and TABLE 1, when 11.5V is supplied to the pixel electrode Ep2 of the second liquid crystal cell in order to charge the gray level voltage of −0.5V, 11V is supplied to the common electrode Ep3 of the second liquid crystal cell. The data voltage 11.5V charged in the pixel electrode Ep2 is kept by the parasitic capacitance of the TFT to be lower by ΔVp than the charge voltage. The data voltage 11V charged in the common electrode Ep3 is also kept by the parasitic capacitance of the TFT to be lower by ΔVp than the charge voltage. However, for the scan time (one horizontal period) of the $n^{th}$ frame period (Fn), −0.5V (pixel voltage in the $(n+1)^{th}$ frame) being the original gray level voltage is charged and kept in the second liquid crystal cell Clc. As a result, the absolute values of the positive pixel voltage and the negative pixel voltage become the same even though it is driven by the frame inversion method when charging the liquid crystal cell with the pixel voltage of the same gray level.

As described above, the liquid crystal display device according to the present disclosure charges the first liquid crystal cell with the potential difference between the first data voltage supplied to the first pixel electrode and the second data voltage supplied to the second pixel electrode, which is adjacent thereto in a horizontal direction. Accordingly, the absolute value of the positive pixel voltage is identical to the absolute value of the negative pixel voltage when driving by the frame inversion method. The liquid crystal display device according to the described embodiments may improve the display quality by minimizing the flickers and residual images.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising: a plurality of data lines; a data drive circuit for supplying a data voltage to the data lines; a plurality of gate lines which cross the data lines; a first pixel electrode of the jth liquid crystal cell and a first common electrode of the (j−1)th liquid crystal cell which are shared by liquid crystal cells that are adjacent in a horizontal direction in a first substrate;

a second pixel electrode of the (j+1)th liquid crystal cell and a second common electrode of the jth liquid crystal cell which are shared by the liquid crystal cells that are adjacent in the horizontal direction and the second pixel electrode is face to face the first common electrode in the first substrate to form an electric field;

a storage capacitor formed by the first pixel electrode of the jth liquid crystal cell overlapped with the second pixel electrode of the (j+1)th pixel electrode for keeping charger of the jth liquid crystal cell for one frame;

a first switch device which connects an odd-numbered data line with the first pixel electrode in response to a scan signal from the gate line; and a second switch device which connects an even-numbered data line with the second pixel electrode in response to a scan signal from the gate line, wherein each of the liquid crystal cells is charged with the potential difference between a first data voltage supplied to the first pixel electrode and a second data voltage supplied to the second pixel electrode, wherein the first pixel electrode is coupled with the first common electrode, wherein the second pixel electrode is coupled with the second common electrode.

2. The liquid crystal display device according to claim 1, wherein the data drive circuit supplies odd data voltages to the odd-numbered data lines and even data voltages, which is lower than the odd data voltages of the odd-numbered data lines, to the even-numbered data lines within a range of the data voltage which are supplied to the liquid crystal cells for the $n^{th}$ frame period.

3. The liquid crystal display device according to claim 1, wherein the data drive circuit supplies odd data voltages to the odd-numbered data lines and even data voltages, which is higher than the odd data voltage of the odd-numbered data lines, to the even-numbered data lines within a range of the data voltage which are supplied to the liquid crystal cells for the $(n+1)^{th}$ frame period.

4. The liquid crystal display device according to claim 1, further comprising:

a second substrate facing the first substrate with the liquid crystal cells disposed between the first and second substrate; and a black matrix disposed on the second substrate to cover the dummy data line, the dummy common electrode and the dummy liquid crystal cell.

5. The liquid crystal display device according to claim 4, wherein the dummy data line crosses the gate line.

6. A liquid crystal display device, comprising: a plurality of data lines; a data drive circuit for supplying a data voltage to the data lines; a plurality of gate lines which cross the data lines; a first pixel electrode of the jth liquid crystal cell and a first common electrode of the (j−1)th liquid crystal cell coupled with liquid crystal cells that are adjacent to a first substrate;

a second pixel electrode of the (j+1)th liquid crystal cell and a second common electrode of the jth liquid crystal cell coupled with the liquid crystal cells that are adjacent to the first substrate, wherein the second pixel electrode to face the first common electrode are configured to establish an electric field;

a storage capacitor formed by the first pixel electrode of the jth liquid crystal cell overlapped with the second pixel electrode of the (j+1)th pixel electrode for keeping charge of the jth liquid crystal cell from one frame;

a first switch device that couples a first set of data lines with the first pixel electrode in response to a first scan signal from the gate line; and a second switch device that couples a second set of data lines with the second pixel electrode in response to a second scan signal from the gate lines, wherein each of the liquid crystal cells is charged with the potential difference between a first data voltage supplied to the first pixel electrode and a second data voltage supplied to the second pixel electrode, wherein the first pixel electrode is coupled with the first common electrode, wherein the second pixel electrode is coupled with the second common electrode.

7. The liquid crystal display device according to claim 6 wherein the first set of data lines include odd-numbered data lines and the second set of data lines include even-numbered data lines.

8. The liquid crystal display device according to claim 7, wherein the data drive circuit supplies odd data voltages to the odd-numbered data lines and even data voltages, which is lower than the analog of the odd-numbered data lines, to the even-numbered data lines within a range of the data voltage which are supplied to the liquid crystal cells for the $n^{th}$ frame period.

9. The liquid crystal display device according to claim 7, wherein the data drive circuit supplies odd data voltages to the odd-numbered data lines and even data voltage, which is higher than the voltage of the odd-numbered data lines, to the even-numbered data lines within a range of the data voltage which are supplied to the liquid crystal cells for the $(n+1)^{th}$ frame period.

10. The liquid crystal display device according to claim 6, further comprising:
   a second substrate adjacent to the first substrate with the liquid crystal cells disposed between the first and second substrate; and
   a black matrix disposed on the second substrate to cover the dummy data line, the dummy common electrode and the dummy liquid crystal cell.

11. The liquid crystal display device according to claim 10, wherein the dummy data line crosses the gate line.

12. The liquid crystal display device according to claim 1, further comprising;
   a dummy data line disposed substantially parallel to the data lines in the outer part of one side of an effective pixel array where the data lines cross the gate lines;
   a dummy pixel electrode connected to the dummy data line; and
   a dummy liquid crystal cell connected to the dummy pixel electrode, wherein the first electrode disposed in the inner part of one side of the effective pixel array is shared by the dummy liquid crystal cell and the liquid crystal cell within the effective pixel array, thus an electric field is applied to the dummy liquid crystal cell together with the dummy pixel electrode.

13. The liquid crystal display device according to claim 1, wherein an absolute value of a positive pixel voltage supplied to the liquid crystal cells is identical to an absolute value of a negative pixel voltage supplied to the liquid crystal cells when driving by the frame inversion method.

14. The liquid crystal display device according to claim 6, further comprising:
   a dummy data line disposed substantially parallel to the data lines in the outer part of one side of an effective pixel array where the data lines cross the gate lines;
   a dummy pixel electrode connected to the dummy data line; and
   a dummy liquid crystal cell connected to the dummy pixel electrode, wherein the first electrode disposed in the inner part of one side of the effective pixel array is shared by the dummy liquid crystal cell and the liquid crystal cell within the effective pixel array, thus an electric field is applied to the dummy liquid crystal cell together with the dummy pixel electrode.

15. The liquid crystal display device according to claim 6, wherein an absolute value of a positive pixel voltage supplied to the liquid crystal cells is identical to an absolute value of a negative pixel voltage supplied to the liquid crystal cells when driving by the frame inversion method.

* * * * *